United States Patent Office 3,419,232
Patented Dec. 31, 1968

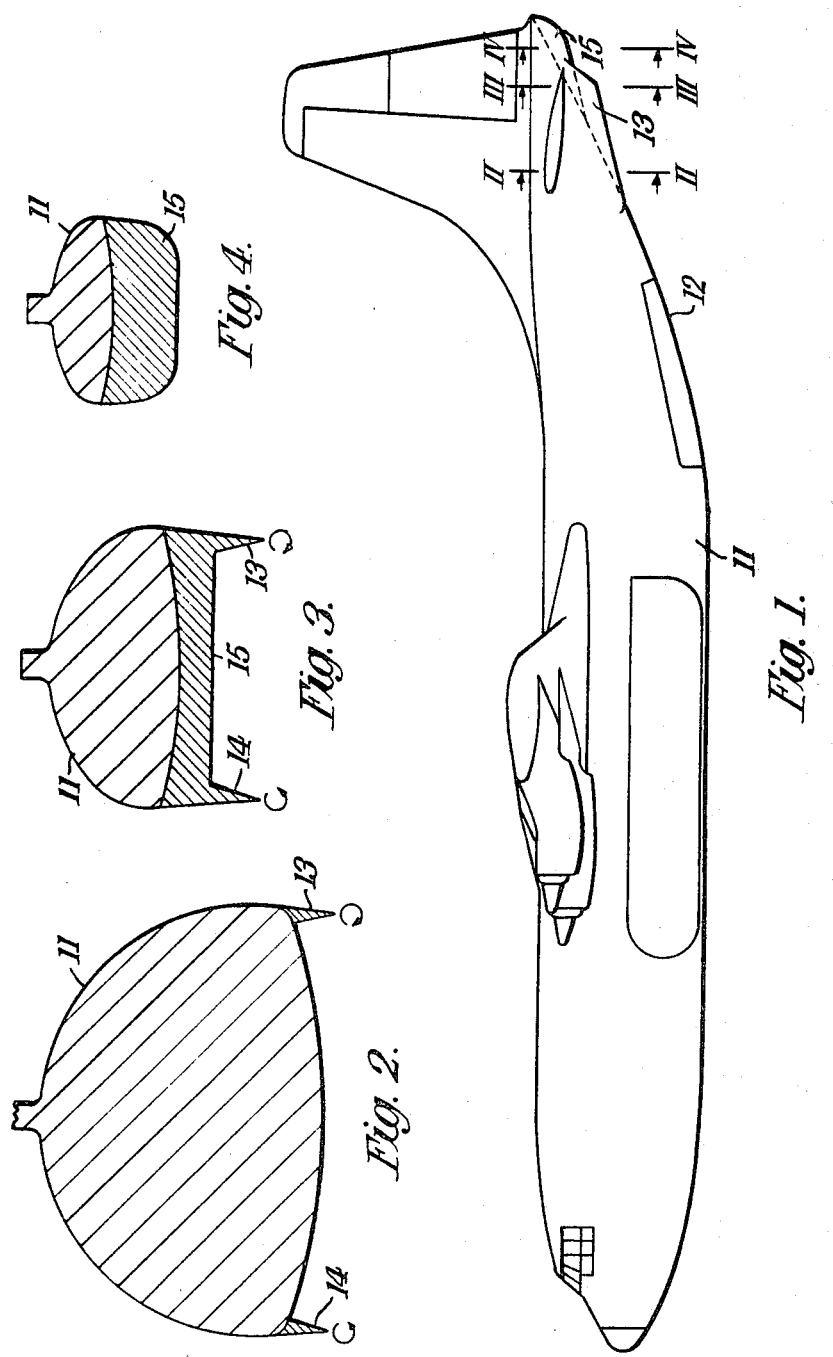

3,419,232
ANTI-DRAG ARRANGEMENTS FOR AERIAL
AND OTHER MOVING BODIES
Morgan Bernard McStay, Lisburn, and John Gilmore
Sloane, Carryduff, Belfast, Northern Ireland, assignors
to Short Brothers & Harlan Limited, Belfast, Northern
Ireland, a company of Northern Ireland
Filed Feb. 6, 1967, Ser. No. 614,255
Claims priority, application Great Britain, Feb. 21, 1966,
7,449/66
3 Claims. (Cl. 244—119)

ABSTRACT OF THE DISCLOSURE

A craft for moving through a fluid having a surface, which produces at least a single flow separation line with a trailing vortex which creates a drag, with a fairing mounted on the craft so as to displace and interfere with the vortex thereby reducing the drag. The surface may be a flattened upsweep undersurface of an aircraft and the fairing a vertically displaced, flat, sharp edged, triangular strake.

---

The present invention relates to an anti-drag arrangement for aerial or other moving bodies and is particularly though not exclusively concerned with an anti-drag arrangement for an aircraft fuselage.

In order to meet the requirements imposed upon modern freight transport aircraft it is usually found to be necessary or desirable so to shape the fuselage that it terminates in a rear end portion with a flattened upswept under surface. A rear end portion of this shape however imposes considerable drag on the aircraft and it is an object of the present invention to provide an arrangement for reducing the drag resulting therefrom.

According to one aspect of the present invention, there is provided an aerial or other body having a portion thereof producing a flow separation line with a trailing vortex, and an anti-drag arrangement comprising a fairing so mounted on the body as to lie in or in close proximity to the path of the vortex to displace and create favourable interference with the latter so as to reduce the drag created thereby.

According to another aspect of the invention there is provided an aircraft having a portion with a flattened surface producing a separation line on each side thereof with a trailing vortex, and an anti-drag arrangement comprising a fairing so mounted on the aircraft as to lie in or in close proximity to each vortex to displace and create favourable interference with the latter so as to reduce the drag created thereby.

Figure 5:
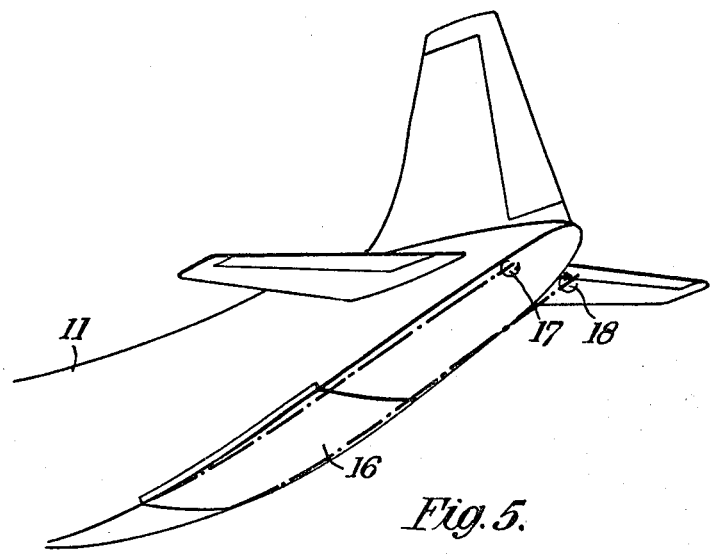
Figure 6:
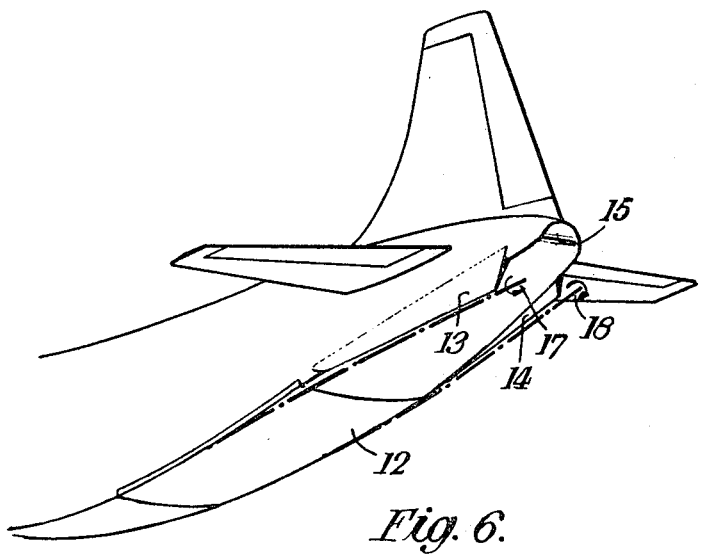

One embodiment of the invention will now be described by way of example with reference to the accompanying drawings in which:

FIG. 1 is a side view of a freight transport aircraft fitted with an anti-drag arrangement according to the invention, FIGS. 2, 3 and 4 are outline sections taken on the lines II—II, III—III, and IV—IV in FIG. 1, FIG. 5 is a perspective view of the tail portion of the aircraft shown in FIG. 1, without the anti-drag arrangement and illustrating schematically the formation of the vortices, and FIG. 6 is a perspective view of the tail portion of the aircraft shown in FIG. 1, including the anti-drag arrangement and illustrating schematically the change in vortex formation resulting therefrom.

Referring to FIGS. 1 to 4 of the drawings, a fuselage 11 is formed with a rear portion having a flattened upswept under surface 12, which has been modified by the addition of two fairings 13 and 14 and an enlargement 15. Each of the fairings 13 and 14 takes the form of a vertically arranged flat sharp-edged triangular strake with its longest side joining the fuselage surface. The length of the fairings is of the order of $\frac{1}{7}$ of an overall length of the fuselage 11 and its depth is of the order of $\frac{1}{45}$ of the overall length of the fuselage. The angle of the triangle, which forms the leading edge of the fairing is an acute angle and in the particular embodiment shown is of the order of 10°. Each of the fairings 13 and 14 is arranged in an approximately vertical disposition, as shown, and extends forwardly and away from the aircraft centre line.

It can be shown that a flow of air round an unmodified rear fuselage flattened upswept undersurface 16 as illustrated in FIG. 5 of the drawings results in the generation of two separation lines (a separation line being defined as a line where two sheets of flow meet and leave a surface together) and the formation of two discrete vortices 17 and 18 which trail aft of and underneath the surface 16 on each side thereof. As shown in FIG. 6, in the modified arrangement according to the invention, each of the fairings 13 and 14 is located on the fuselage 11 in the region in which a separation line is formed, causing a displacement of and a favourable interference effect with the vortex, and thereby reducing the drag normally created by the latter. It has been found that the drag in a cruising condition of the aircraft can be reduced by approximately 6 percent by using the anti-drag arrangement hereinbefore described.

The enlargement 15 of the fuselage 11 is provided to give lateral stability to the two fairings 13 and 14 although it can be shaped to effect further drag reduction.

What we claim as our invention and desire to secure by Letters Patent is:

1. An aircraft having a flattened surface producing a flow separation line on each side of said surface with a trailing vortex creating a drag and two fairings each mounted on said aircraft so as to lie in close proximity to a vortex so as to displace and interfere with said vortex to reduce said drag wherein said surface is an upswept surface of a rear fuselage portion of the aircraft and said fairings are vertically disposed, flat, sharp edged, triangular strakes each having its longest side joining the surface of said fuselage rear portion.

2. An aircraft according to claim 1 wherein said flattened upswept undersurface is terminated at the rear by an enlargement giving lateral stability to the two fairings.

3. An aircraft according to claim 1 wherein said flattened upswept surface is terminated at the rear by an enlargement which reduces the inclination to the aircraft longitudinal axis of said upswept surface at the rear end to further reduce said drag.

References Cited

UNITED STATES PATENTS

| 2,775,419 | 12/1956 | Hlobil | 244—91 X |
| 3,117,545 | 1/1964 | Warner | 114—67 X |
| 3,323,154 | 6/1967 | Lambach | 9—310 |

FOREIGN PATENTS

| 1,299,579 | 5/1961 | France. |

MILTON BUCHLER, *Primary Examiner.*

T. W. BUCKMAN, *Assistant Examiner.*

U.S. Cl. X.R.
244—40; 114—67